April 24, 1956 N. B. HANNAY 2,743,200

METHOD OF FORMING JUNCTIONS IN SILICON

Filed May 27, 1954

INVENTOR
N. B. HANNAY
BY
Arthur J. Torsiglieri
ATTORNEY

United States Patent Office 2,743,200
Patented Apr. 24, 1956

2,743,200

METHOD OF FORMING JUNCTIONS IN SILICON

Norman B. Hannay, Chatham, N. J., assignor to Bell Telephone Laboratories, Incorporated, New York, N. Y., a corporation of New York Application May 27, 1954, Serial No. 432,792

6 Claims. (Cl. 148—1.5)

This invention relates to methods for controlling the conductivity characteristics of silicon, and more particularly to methods for forming in a controllable manner p-n junctions in silicon bodies.

A broad object of the invention is to form silicon bodies of controlled conductivity characteristics.

A more specific object is to facilitate the formation in a controllable way of p-n junctions in silicon. A related object is to facilitate the manufacture of semiconductive devices which utilize silicon bodies having p-n junctions therein.

Semiconductive devices are growing rapidly in importance in the electronics art. Among semiconductive materials which hold forth the greatest potential promise for use in semiconductive bodies to be incorporated in such devices is silicon. Silicon is particularly attractive for many uses where low reverse currents and stability at high temperatures are important because of the relatively wide gap in energy levels between its valence band and conduction band.

In most semiconductive devices, it is important that the semiconductive body include contiguous zones of opposite conductivity type for forming one or more of what are generally termed "p-n" junctions. A p-n junction is a region of transition between a zone in which the significant impurities in the semiconductor are such that condition therein is by holes and a zone in which the significant impurities are such that conduction therein is by electrons. The term "significant impurity" is intended to include both chemical impurities and defects or dislocations in the structure of the crystal which result in either an excess or deficiency of conduction electrons.

Accordingly, if silicon is to be used effectively as the semiconductive material in semiconductive devices, it becomes important to develop techniques for forming p-n junctions in silicon, particularly in silicon which is highly purified and in monocrystalline form since such silicon is found best suited for most applications.

Various techniques have been used hitherto for controlling the formation of p-n junctions in silicon bodies. Some have involved the addition of chemical impurities by diffusion into selected portions of a silicon body substantially of the shape and form to be incorporated into a semiconductive device.

Another class of techniques has been based on the now familiar method for growing monocrystalline silicon by pulling. In such a method, a single crystal silicon seed is lowered into a melt of silicon and then, while being rotated, slowly withdrawn vertically therefrom through a cooling zone at a rate no greater than the rate of solidification of the silicon uplifted by the seed crystal. The silicon crystal grows in the form of a filamentary rod. By adding appropriate chemical impurities to the melt at different stages of withdrawal of the rod, there can be formed p-n junctions in the rod. Alternatively, by changing the rate of withdrawal of the rod to vary the rate of growth, p-n junctions can be formed in the rod. For use as silicon bodies in semiconductive devices, wafers which include suitable p-n junctions are carved out of the rod.

In a copending application Serial No. 432,638, filed May 27, 1954, by C. S. Fuller, it is pointed out that silicon rods which have been grown by pulling in the manner set forth above have been discovered to be temperature sensitive. In particular, it is found that heating to a temperature of between 350° C. and 500° C. for several hours and then cooling increases significantly the number of excess electrons in the core of the rod. As a result, upon extended heating at approximately 450° C. rods grown by pulling in this way which initially are p-type are found to have their cores converted to n-type, and rods initially n-type are found to have their cores made even more strongly n-type. Moreover, upon extended heating to temperatures above 900° C. the rod is found to revert to its initial conductivity type.

The present invention is based on the discovery that only that portion of a silicon rod which has been grown while the melt is being stirred is subject to the temperature effects discovered by C. S. Fuller. In particular, it is found advantageous to achieve the desired stirring by the rotation of the rod as it is being pulled.

To this end, a basic feature of the present invention comprises agitating the melt selectively as the rod is being grown.

In particular, in a preferred form of practice of the invention, the rod is rotated for a time while being grown and not rotated at other times while being grown. Then, to utilize the present discovery to advantage, it is further necessary to heat for an extended time the silicon rod to a temperature of approximately 450° C. to effect a conversion in conductivity type of the rotated portions of the rod. Since the non-rotated portions remain substantially unaffected by the heating, if the silicon rod is grown to be initially all p-type after heating there results a p-n junction in the transition region between rotated and non-rotated portions of the rod. Thereafter, wafers including such p-n junctions may be carved from the rod for use in semiconductive devices in the manner known to workers in the art.

The invention will be better understood from the following more detailed description taken in conjunction with the accompanying drawings in which.

Figure 1:
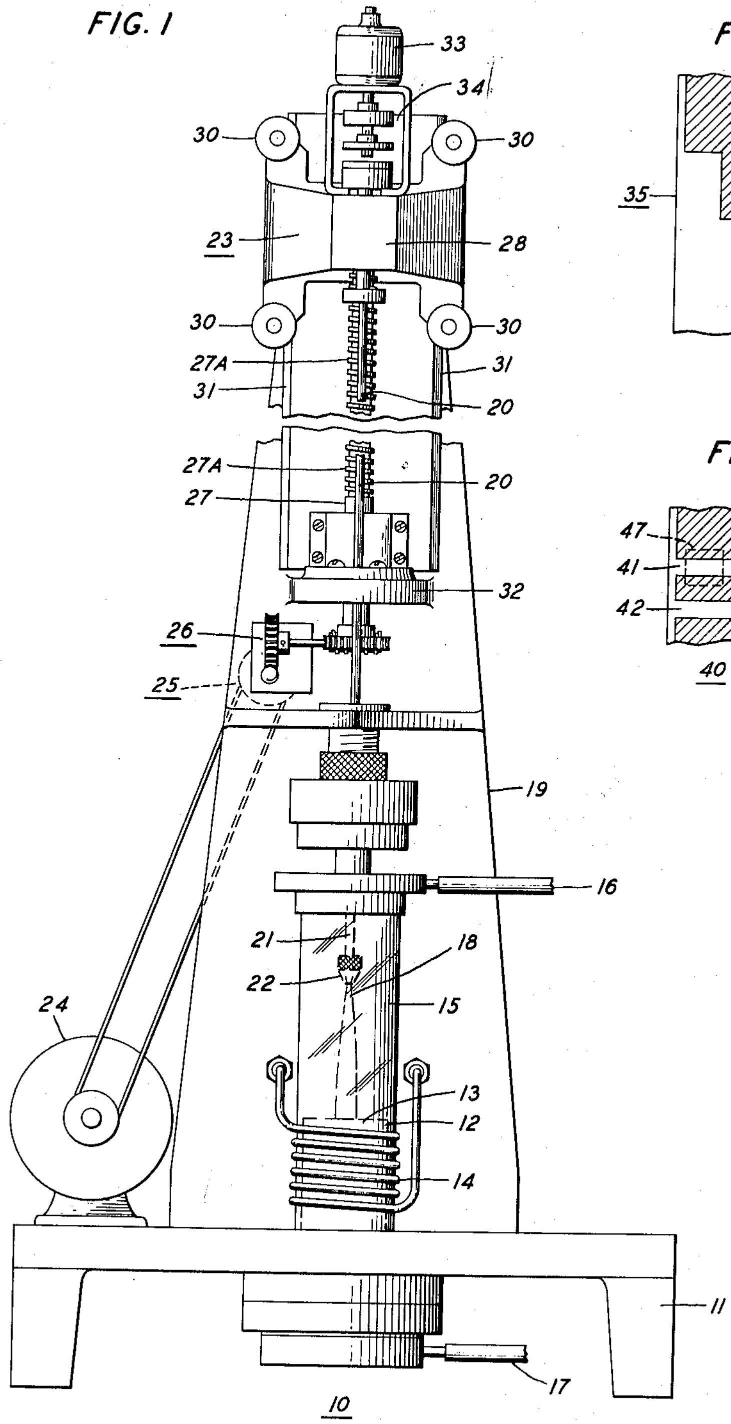
Fig. 1 shows apparatus for growing a filamentary rod of monocrystalline silicon with provision for rotating and non-rotating the rod during growing.

Referring now more particularly to the drawings, in Fig. 1 there is shown the basic elements of a crystal growing machine of a kind adapted for growing monocrystalline silicon which during growing can be rotated in some parts and non-rotated in other parts in accordance with the preferred practice of the invention. The various elements are supported on a base or stand 11. Within a quartz-lined graphite crucible 12 there is deposited highly purified silicon 13. Various techniques are known in the art for obtaining high purity silicon. The silicon is inductively heated to a temperature above its melting point by means of induction coils 14 which surround the crucible 12 and through which are passed radio frequency currents. To minimize contamination of the melt during the growing process, the crucible 12 is enclosed within a transparent quartz bell jar 15 through which is passed a suitable inert gas, such as helium, by means of an inlet 16 and outlet 17. The gas also serves as a coolant for freezing the silicon removed from the melt.

In the growing process, a single crystal silicon seed is lowered below the surface of the silicon melt and slowly raised, uplifting with it silicon from the melt. The rate of withdrawal is kept no greater than the rate of solidification of the silicon uplifted from the melt as it passes through a cooling zone above the surface of the melt. The apparatus for controlling the raising and rotating of the silicon seed 18 is supported by the frame 19. Housed by the frame 19 is the main shaft 20. At its lower end the main shaft includes a spindle 21 to which is attached a chuck 22 by which the silicon seed 18 is supported. The vertical motion of the seed is controlled by vertical motion of this main shaft 20. The main shaft is supported as part of a carriage assembly 23 which moves vertically along the frame. The movement of the carriage assembly is controlled by a motor 24. Rotation of the motor is transmitted by means of a pulley arrangement 25 and a set of gears 26 to rotation of a shaft 27 which includes a threaded portion 27A which screws into an internally threaded member 28 which is part of the carriage assembly. This threading action results in vertical motion of the carriage assembly. The carriage assembly includes four wheels 30 which ride vertically up and down the frame along a pair of tracks 31 supported from a platform 32 which forms part of the frame. In particular, it is found that the best results are achieved when the crystal is grown at a rate of from .05 to 3.0 mil per second.

The carriage assembly further includes a motor 33 which can be connected by way of a magnetic clutch 34 to the main shaft 20 for imparting a desired rotation thereto. By means of a switch not shown, the motor 33 may be either connected or disconnected at will from the main shaft. It can be seen that by this arrangement the vertical motion and the rotation of the main shaft are kept independent. Moreover, by means of the clutch 34 the gear ratio between the motor drive and the main shaft can be varied at will. In the apparatus which has been used, the rate of rotation can be varied up to 900 revolutions per minute. However, in practice, it has been found advantageous for the desired stirring of the melt to operate at a rotation rate of 100 revolutions per minute for a pulling rate of one mil per second.

Moreover, as indicated above, although rotation of the rod is the preferred method for achieving agitation of the melt when it is desired, such agitation can be attained in various alternative ways. For example, a separate paddle may be inserted in the melt for stirring the melt at selected time intervals, or provision can be made for vibrating, rotating or shaking the crucible at suitable time intervals to achieve the desired agitation.

Figure 2:
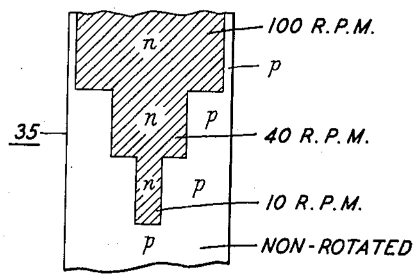
Fig. 2 shows a section of a filamentary rod which has been grown with varying rates of rotation and then heated at approximately 450° C. for several hours.

In Fig. 2, there is shown a section taken along the axis of growth after heating of a portion of a filamentary rod 35 grown with the arrangement shown in Fig. 1 where for purposes of illustration, the rate of rotation of the rod during growing was decreased from 100 revolutions per minute in a series of discrete steps to a rotation rate of 10 revolutions per minute and finally stopped completely. The rod after being grown was heated at approximately 450° C. for several hours to cause the conversion of conductivity type described above.

In this figure, n-type regions are shown with cross-hatching and p-type regions without. Moreover, there is shown plotted alongside of successive vertical portions of the rod the rate at which the rod was rotated at the time it was being grown. As is shown, for sections grown at high rates of rotation, a large portion of the core is converted to n-type as a result of heating. The thickness of the core which is changed in conductivity type as a result of heating is seen to decrease with decreasing rotation rate. In the limiting case of no rotation, it is seen that none of the core is affected by heating.

Figure 3:
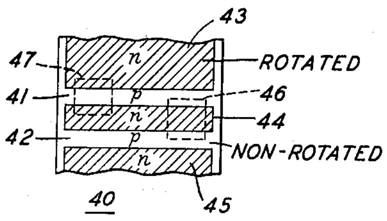
Fig. 3 shows a section of a filamentary silicon rod which has been grown rotated in part and non-rotated in part and then heated to form a succession of p-n junctions therein in accordance with the invention.

Fig. 3 shows in similar fashion a section taken along the axis of growth of a suitably heat-treated filamentary rod 40 in which the rotation of the rod was interrupted for two closely spaced intervals during the growing process. Accordingly, there is formed two p-type channels 41, 42 intermediate three portions of n-type core 43, 44 and 45. It can be appreciated that by suitable cutting there can be carved from the rod a number of either n-p-n or p-n-p wafers each suitable for use as the semiconductive body of a transistor. For example, by cutting along the broken lines 46 there can be had a p-n-p body. Similarly, an n-p-n body can be made by cutting along the broken lines 47.

Moreover, it can be seen that any desired arrangement of p-n junctions can be realized in the filamentary rod by appropriate control of the rotation and non-rotation of the rod during growing.

As described more fully in the earlier identified Fuller application, the heating effect is also a function of the diameter of the crystal grown. For example, for rods of sufficiently small diameter, the effect is not observed even when the rod is rotated during growing. For example, for a rotation rate of 100 revolutions per minute, rods of diameter of less than approximately 0.3 inch were found to be relatively unaffected. Accordingly, it is to be noted that there is a minimum amount of agitation of the melt which must be exceeded if the temperature sensitivity effect is to be achieved. Moreover, for a constant rate of rotation, the portion of the core affected by heating increases with increasing diameter. As is known to workers in the art, the diameter of the rod can be controlled both by the pulling rate at which it is grown and the temperature of the melt. It is usually convenient to grow rods which have a diameter of approximately one inch.

Another difference found between portions of the rod which have been rotated and portions non-rotated is that of relative concentration of traps of the kind described in The Physical Review, vol. 90, pp. 152–153, in an article entitled "Temporary Traps in Silicon and Germanium." In particular, it is found that the concentration of such traps in portions which have not been rotated is considerably lower. Accordingly, for applications where silicon with a low concentration of traps is desired, it is advantageous to keep the agitation of the melt at a minimum. On the other hand, for applications where a high concentration of traps is desirable, silicon which has been rotated while grown is preferred.

Moreover, as is described more fully in the aforementioned Fuller application, heat treating in the range of between 350°–500° C. is most efficacious for causing a conversion from p-type to n-type conductivity when the p-type material is initially of a resistivity higher than about 0.5 ohm-centimeters.

Moreover, it is also desirable to avoid agitation of the melt, so that insensitivity to heat is realized, when growing silicon material which is later to be heated to temperatures high enough to cause a conversion in conductivity type. For example, silicon to be used as the semiconductive body of an alloy-diffusion junction type transistor is advantageously grown with a minimum of agitation of the melt.

It is to be understood that the specific apparatus which has been described for carrying out the method of the invention is merely illustrative. Various other expedients can be used without departing from the spirit and scope of the invention.

What is claimed is:

1. The method of forming a p-n junction in monocrystalline silicon which comprises the steps of lowering a single crystal seed of silicon into a silicon melt containing a conductivity type determining impurity in quantity sufficient to impart conductivity type characteristics to material solidified therefrom, raising the seed through a cooling zone while uplifting material from the melt for forming a progressively increasing length of crystal, stirring the melt during only selected intervals of the time of formation of the length of crystal, and heating the formed crystal at a temperature in the range of 350–500° C. for changing the conductivity type of portions of the length of the crystal.

2. The method of forming a p-n junction in a silicon single crystal which comprises the steps of lowering a single crystal seed of silicon in a silicon melt containing a conductivity type determining impurity in quantity sufficient to impart conductivity type characteristics to material solidified therefrom, raising the seed crystal through a cooling zone for forming a progressively increasing length of crystal, stirring the melt during only selected intervals of the time of formation of the length of the crystal, and heating the formed crystal at approximately 450° C. for at least an hour for changing the conductivity type of portions of the length of the crystal grown during the selected intervals of agitation of the melt.

3. The method of forming a p-n junction in a silicon single crystal which comprises the steps of lowering a single crystal seed of silicon below the surface of a silicon melt containing a conductivity type determining impurity in quantity sufficient to impart conductivity type characteristics to material solidified therefrom, raising the seed crystal through a cooling zone for forming a progressively increasing length of crystal, rotating the formed length of crystal at a rate greater than approximately ten revolutions per minute with respect to the melt during only a portion of the time of formation of the length of the crystal, the formed length of the crystal not being rotated with respect to the melt during the other portion of the time of formation of the crystal, and heating the formed crystal at a temperature in the range of 350–500° C. for changing the conductivity type of rotated portions of the length of the crystal with respect to nonrotated portions.

4. The method of forming a p-n junction in monocrystalline silicon which comprises the steps of lowering a single crystal seed of silicon into a silicon melt containing a conductivity type determining impurity in quantity sufficient to impart conductivity type characteristics to material solidified therefrom, raising the seed through a cooling zone while uplifting material from the melt for forming a progressively increasing length of crystal, rotating the formed length of crystal at a rate greater than approximately ten revolutions per minute with respect to the melt during only a portion of the time of formation of the length of crystal, and heating the formed crystal at a temperature in the range of 350–500° C. for changing the conductivity type of rotated portions of the length of the crystal with respect to nonrotated portions.

5. The method of forming a p-n junction in a single crystal of silicon which comprises the steps of lowering a single crystal seed of silicon into a silicon melt containing a conductivity type determining impurity in quantity sufficient to impart conductivity type characteristics to material solidified therefrom, raising the seed crystal through a cooling zone while uplifting material from the melt for forming a progressively increasing length of crystal, rotating the formed length of crystal at a rate greater than approximately ten revolutions per minute with respect to the melt during only a portion of the time of formation of the length of crystal, the formed length of crystal not being rotated during the other portion of the time of formation, and heating the formed crystal to approximately 450° C. for at least an hour for changing the conductivity type of rotated portions of the length of the crystal with respect to nonrotated portions.

6. The method of forming a p-n junction in a single crystal of silicon which comprises the steps of lowering a single crystal seed of silicon into a silicon melt containing a conductivity type determining impurity in quantity sufficient to impart conductivity type characteristics to material solidified therefrom, raising the seed crystal through a cooling zone while uplifting material from the melt for forming a progressively increasing length of crystal, rotating the formed length of crystal at a rate greater than approximately ten revolutions per minute with respect to the melt during only a portion of the time of formation of the length of crystal, the formed length of crystal not being rotated during the other portion of the time of formation, and heating the formed crystal to approximately 450° C. for at least an hour for changing the conductivity type of rotated portions of the length of the crystal with respect to nonrotated portions.

References Cited in the file of this patent

UNITED STATES PATENTS

| | | |
|---|---|---|
| 2,631,356 | Sparks | Mar. 17, 1953 |
| 2,689,930 | Hall | Sept. 21, 1954 |

FOREIGN PATENTS

| | | |
|---|---|---|
| 706,858 | Great Britain | Apr. 7, 1954 |